United States Patent [19]

Choi

[11] Patent Number: 5,365,384
[45] Date of Patent: Nov. 15, 1994

[54] VIDEO TAPE RECORDER HAVING AUTOMATIC INDEX SCAN METHOD AND PICTURE-IN-PICTURE FUNCTION

[75] Inventor: Seung-lyul Choi, Suwon, Rep. of Korea

[73] Assignee: SamSung Electronics Co., Ltd., Suwon, Rep. of Korea

[21] Appl. No.: 701,759

[22] Filed: May 17, 1991

[30] Foreign Application Priority Data

Apr. 25, 1991 [GB] United Kingdom .................. 910984

[51] Int. Cl.$^5$ ............................................ H04N 5/782
[52] U.S. Cl. .................... 360/72.2; 360/10.1; 360/33.1; 358/335; 348/567
[58] Field of Search ............ 360/10.1, 33.1, 72.2; 358/183, 191.1, 335; 395/153, 154

[56] References Cited

U.S. PATENT DOCUMENTS

| | | | |
|---|---|---|---|
| 4,665,438 | 5/1987 | Miron et al. | 358/183 |
| 4,665,439 | 5/1987 | Naimpally | 358/183 |
| 4,729,027 | 3/1988 | Hakamada et al. | 358/183 |
| 4,890,168 | 12/1989 | Inoae et al. | 358/183 |
| 5,187,589 | 2/1993 | Kono et al. | 358/335 |

FOREIGN PATENT DOCUMENTS 59-201249 11/1984 Japan.
62-141873 6/1987 Japan.

OTHER PUBLICATIONS

"Electronics Lie", Journal issued by NHK dated Mar. 1987, pp. 123-126. (No translation).
"Sanyo Technical Review" issued Feb. 1987, vol. 19, No. 1, pp. 76-84. (No Translation).

Primary Examiner—Timothy P. Callahan
Attorney, Agent, or Firm—Robert E. Bushnell

[57] ABSTRACT

An index scan apparatus and the method thereof applied to a video tape recorder. Video signals corresponding to one screen among reproduced video signals are stored whenever an index signal is detected during the reproducing mode, and video signals received during the setting of an index scan mode are displayed into a main screen and video signals stored on the memory corresponding to the detected index identification data are displayed by a plurality of subscreens. Thus, the user is easily able to find the desired program from among the programs recorded on a magnetic tape.

17 Claims, 5 Drawing Sheets

VIDEO TAPE RECORDER HAVING AUTOMATIC INDEX SCAN METHOD AND PICTURE-IN-PICTURE FUNCTION

BACKGROUND OF THE INVENTION

The present invention relates to a video tape recorder (hereinafter, referred to as VTR) having an index scan function for searching at a high speed a starting position of each program on a magnetic tape in response to an index signal for indicating a starting position of a program and a picture-in-picture (hereinafter, referred to as PIP) function for forming and outputting a video signal for PIP display, and more particularly to an apparatus and the method thereof for outputting video signals for one screen at the starting position of the program corresponding to each index signal and automatically searching the starting position of the program required by the user.

The conventional VTR includes a VTR comprising a so-called index scan function performing pulse-width modulation of a control signal in response to an index signal indicating the starting position of each program recorded on a magnetic tape and recording the modulated control signal, to search for the recorded program utilizing such an index signal as an index scan function. A VISS (Video Index Search System) utilizing only an index signal or a VASS (Video Address Search System) utilizing an address signal indicating an absolute address of a tape in addition to the above described index signal are generally used. The VTR with such an index scan function is described in for example, Japanese Laid-open Patent No. 201249/1984 and "Electronics Life", Journal issued by NHK, March, 1987 (pp. 123–126).

More specifically, in a VTR with the above described index scan function, a control track having a control signal recorded thereon is formed on a magnetic tape to control tape travel. Actually, the duty ratio of the control signal (pulse) is changed depending on the data content of an index signal indicating the starting position of each recorded program. More specifically, in such a VTR even in a fast forward mode (FF mode) or a rewind mode (REW mode) in which a tape is traveled at high speed by half-loading control, the tape is traveled with a control head that records and reproduces a control track in contact with a control track of the tape. In particular, when an index scan mode is set, the change of the duty ratio of the control signal, i.e., the index signal is detected by the control head during high-speed traveling of the tape, so travel control comes about through only short intervals in the normal reproducing mode by a reversing or not reversing of the tape travel a constant amount each time the index signal is detected, thus reproducing, in order, the start position of a recorded program.

On the other hand, the conventional VTR includes a VTR comprising a PIP function utilizing a time-base compression of either one of a video signal reproduced from a recorded medium or a video signal received by a tuner contained in the VTR and a video signal externally inputted and by combining the aforementioned compressed signal another video signal, a video signal for picture-in-picture display in which a subscreen is inserted into a part of a main screen is formed and outputted the same. The VTR with such a PIP function is actually described in "Sanyo Technical Review" published in 1987, Vol. 19, No. 1, pp. 76–84.

The conventional VTR with the above described index scan function is adapted so that the output of the received video signal is interrupted to output the reproduced video signal every time the index signal is detected during the index scan mode.

Additionally, a VTR has been put into application in which reproduced pictures are sequentially reduced and displayed every time the index signal is detected, to form a plurality of subscreens without forming the above described main screen in the VTR with the above described index scan function. Such a VTR is disclosed in Japanese Laid-open Patent No. 141873/1987.

As described above, the conventional VTRs are very inconvenient since the reproduced video signal is displayed with the received video signal or the externally inputted video signal, every time the index signal is detected during the index scan mode.

SUMMARY OF THE INVENTION

Accordingly, it is an object of the present invention to provide an automatic index scan apparatus and the method thereof of a VTR in which a received video signal and the index information can be displayed with multiple PIP screens.

To achieve the object, in a video tape recorder fox reproducing the contents recorded on a magnetic tape having an index signal recorded in the starting position of each recorded program, the present invention stores video signals in a memory for one screen every time an index signal is detected during the normal reproducing mode, and forms video signals received by a tuner contained in the video tape recorder into a main screen and video signals stored in a memory into subscreens during the setting of an index scan mode.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Hereinafter, the present invention will be described in detail with reference to the accompanying drawings.

Figure 1:
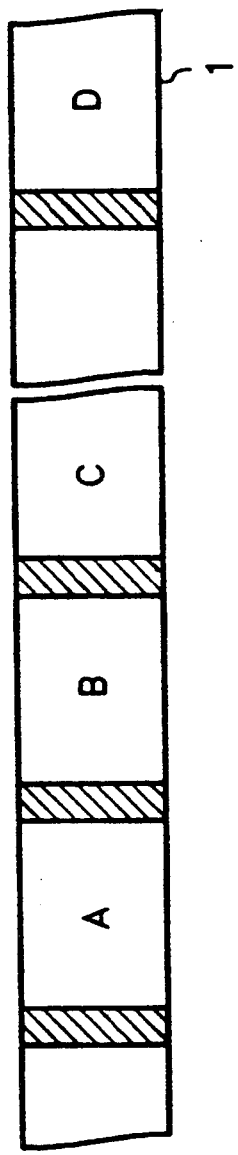
FIG. 1 is a typical diagram for explaining the position where each program and each index signal are recorded on a magnetic tape.

FIG. 1 is a typical diagram for explaining the position where each program and each index signal are recorded on a magnetic tape. In FIG. 1, index signals of the above described VASS are recorded on control tracks (not shown) corresponding to hatched portions immediately before the respective starting positions of recorded programs A, B, C and D formed on a tape 1. More specifically, a control signal for controlling tape traveling is recorded on a control track (not shown) formed in one side portion of the tape 1 shown in FIG. 1. However, the duty ratio itself of the control signal (pulse) is not related to control of the tape traveling. At the time of recording, the duty ratio of the control pulse is changed depending on the data contents of an index signal and an address signal such that it is 27.5% with respect to data "1" and 60% with respect to data "0", for example, to record the control pulse. The change of the duty ratio of the control pulse thus recorded is detected by a control head (not shown) in the index scan mode, to retrieve the starting position and an address of each recorded program.

Figure 2:
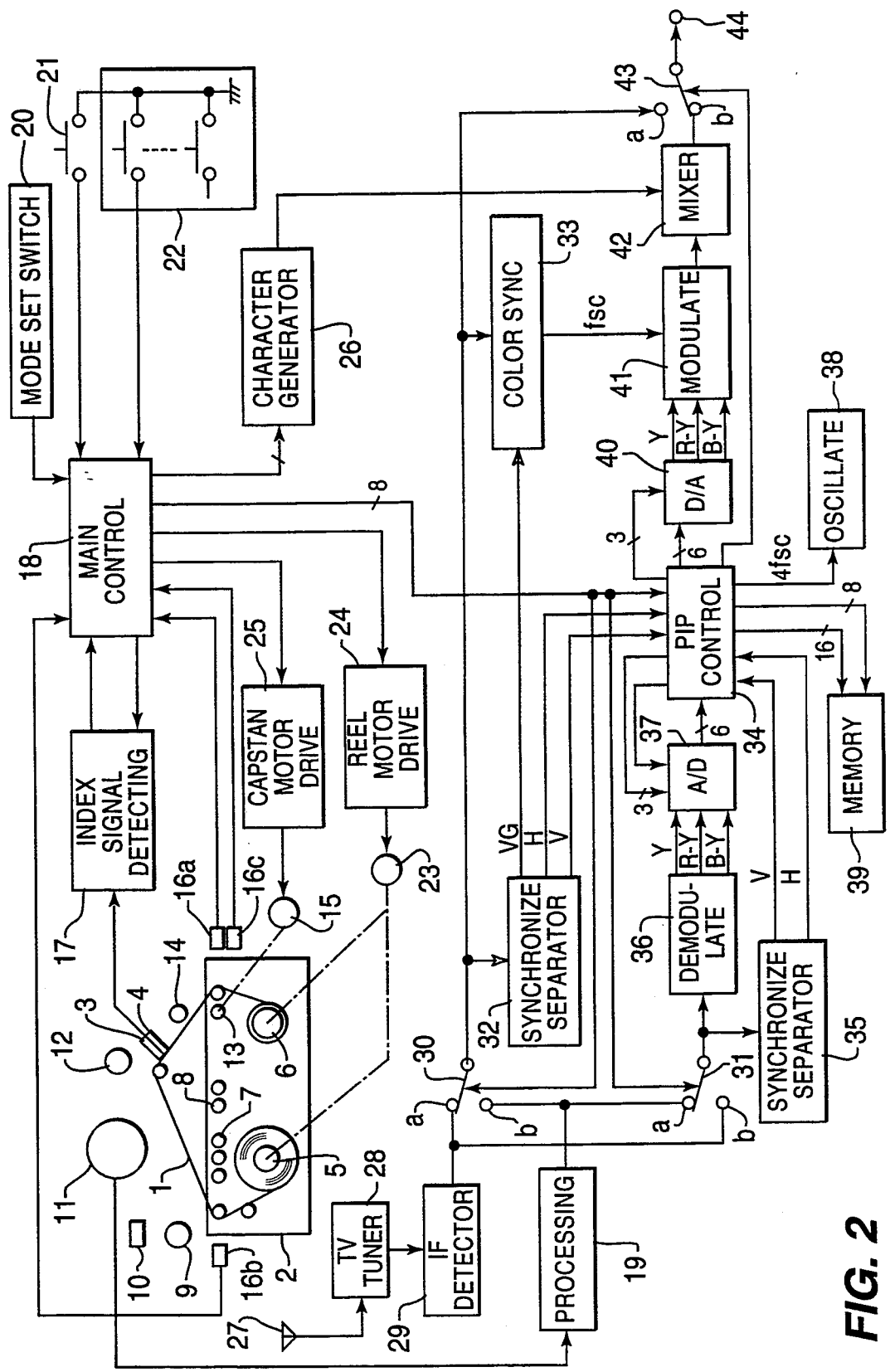
FIG. 2 is a block diagram showing an automatic index scan apparatus according to an embodiment of the present invention.

FIG. 2 is a schematic block diagram showing a VTR according to an embodiment of the present invention. The VTR shown in FIG. 2 generally comprises a circuit for index scanning, a circuit for PIP processing and a control circuit for simultaneously operating these circuits.

Description is now made on structure of the circuit for index scanning in the VTR. The structure of circuit for index scanning generally comprises a loading mechanism, a detecting circuit of an index signal and a main control circuit. In FIG. 2, a magnetic tape 1 is contained in a video cassette 2. FIG. 2 shows a state in which the magnetic tape 1 is loaded in a half-loading state for fast forwarding or rewinding by the loading mechanism (not shown). In the half-loading state at the time of such fast forwarding or rewinding, the magnetic tape 1 travels at high speed from a supply reel 5 to a take-up reel 6 or vice versa while being in contact with a fixed head (AE head) 3 for erasing an audio track and a fixed head (AC head) 4 for recording and reproducing the audio track and a control track on the other hand, if and when guides 7 and 8 move to predetermined positions so that the magnetic tape 1 is loaded in a normal loading state for recording and reproducing, it is assumed that the magnetic tape 1 comes in contact with an impedance roller 9 and a full-track erase head 10, is wound around a head drum 11 over an angle of approximately 180°, and further travels from the supply reel 5 to the take-up reel 6 while being in contact with an impedance roller 12, the AE head 3 and the AC head 4. In such a normal loading state, a pinch roller 14 moves toward capstan shaft 13, to press the magnetic tape 1 on the capstan shaft 13. Consequently, the traveling speed of the tape 1 is controlled to be a recording and reproducing speed defined by rotation of a capstan motor 15.

A tape top detecting sensor 16a and a tape end detecting sensor 16b each comprising an optical sensor are disposed in the vicinity of the video cassette 2. The former detects the passage of a leader portion having no magnetic material adhered thereto in the top of the tape to generate a tape top detecting signal while the latter detects the passage of the end of the tape also having no magnetic material adhered thereto to generate a tape end detecting signal. A cassette detecting sensor 16c generates a cassette detecting signal of different logic states according to the existence or the absence of the cassette 2. The cassette detecting signal has a high logic state when the cassette 2 is installed, and has a low logic state when the cassette 2 is not installed. In addition, a reproduced signal from the AC head is applied to an index signal detecting circuit 17. The index signal detecting circuit 17 detects an index signal recorded on the control track of the tape to Generate an index detecting signal, and identifies by the address signal the starting position which the detected index signal indicates, of the starting positions of the programs recorded on the tape 1, to output identification data together with the index detecting signal, to the main control circuit 18. A pair of rotary heads (not shown) for helically scanning the video track of the tape 1 to record and reproduce the same in an azimuth scheme are arranged in positions spaced apart from each other by 180° around the head drum 11. A reproduced signal reproduced by the pair of heads is applied to a reproduced signal processing circuit 19, to be converted into a reproduced video signal.

The main control circuit 18 has a control function for the above described loading mechanism, tape traveling, and a PIP function as described below. The main control circuit receives detection signals from the sensors 16a and 16b as described above and the identification data from the index signal detecting circuit 17, a setting signal of an operation mode setting switch 20 for designating various operation modes of the VTR such as recording and reproducing, a setting signal of an index scan mode setting switch 21 for setting an index scan mode, and a designating signal of an address designating switch comprising a called ten-key switch for addressing a desired recorded program.

On the other hand, the main control circuit 18 is responsive to the input signals for applying driving control signals to a reel motor driving circuit 24 for driving a reel motor 23 for rotating the reels 5 and 6 and a capstan motor driving circuit 25 for driving the capstan motor 15, respectively. In addition, the main control circuit 18 applies a control signal for displaying the identified address to a character generator 26 for forming address numbers and characters, and further outputs a PIP control signal of 8 bits to control the PIP function as described below. The PIP control signal of 8 bits consists of a 2-bit signal for controlling the switches 30 and 31, a 3-bit signal for designating storage regions of the memory 39 for contents of one screen and another 3-bit signal for selecting PIP display modes.

Following is a description of the structure of a PIP circuit in the VTR shown in FIG. 2. In FIG. 2, a television signal received by TV receiving antenna 27 and a TV tuner 28 is applied to an IF (intermediate frequency) detector circuit 29. The detector circuit 29 IF-amplifies and detects the received television signal outputted from the TV tuner 28, to output the received video signal. Each of switches 30 and 31 is a switch having two contacts a and D for displaying a picture-in-picture screen comprising a main screen and a subscreen. The received video signal from the detector circuit 29 is inputted to the contact a of the switch 30 and the contact b of the switch 31, and the reproduced video signal from the reproduced signal processing circuit 19 is inputted to the contact b of the switch 30 and the contact a of the switch 31, The switches 30 and 31 are respectively driven so that each of the switches 30 and 31 is switched between the contacts a and b in response to the PIP control signal from the main control circuit. Consequently, a video signal for the main screen and a video signal for the subscreen are outputted from the switches 30 and 31, respectively. The outputs of the switches 30 and 31 may be identical signals, i.e., received video signals or reproduced video signals. Also, the outputs of the switches 30 and 31 may be different signals. That is, one is a received signal and the other one is a reproduced signal.

Then, a synchronizing separator circuit 32 is connected to a switching piece of the switch 30. The synchronizing separator circuit 32 separates a burst gate pulse VG, a horizontal synchronizing signal H and a vertical synchronizing signal V in the video signal for the main screen outputted from the switch 30, to output the same. The burst gate pulse VG is applied to a color synchronizing circuit 33, and horizontal and vertical synchronizing signals H and V are applied to a PIP control circuit 34 as described below.

On the other hand, a synchronizing separator circuit 35 and a demodulator circuit 36 are connected to a switching pivot of the switch 31. The synchronizing separator circuit 35 separates a horizontal synchronizing signal H and a vertical synchronizing signal V in the video signal for the subscreen outputted from the switch 31, to output the same. The horizontal synchronizing signal H and the vertical synchronizing signal V are applied to a PIP control circuit 34. In addition, the demodulator circuit 36 demodulates the video signal for the subscreen outputted from the switch 31 into a luminance signal Y and color difference signals and B−Y (R and B are primary color signals of red and blue signals, respectively), to separate and output the same.

Each output of the demodulator circuit 36 is applied to an A/D converter circuit 37 with a multiplexing function. The A/D converter circuit 37 is responsive to a multiplex control signal of 3 bits applied from the pip control circuit 34 for converting the luminance signal Y and the color difference signals R−Y and B−Y inputted from the demodulator circuit 36 in a dot sequential manner by repeating sequential high-speed selection of the inputted signals. Furthermore, the A/D converter circuit 37 is responsive to an A/D clock signal applied from the PIP control circuit 34 for converting into digital data of bits the above described luminance signal Y and color difference signals R−Y and B−Y as converted in a dot sequential manner, respectively.

Then, the PIP control circuit 34 has a PIP function of inserting into the main screen video signal at least one subscreen video signal outputted from the switch 31. More specifically, the PIP control circuit 34 receives a PIP control signal of 6 bits from the main control circuit the horizontal and vertical synchronizing signals H and V from the synchronizing separator circuit 32, the horizontal and vertical synchronizing signals H and V from the synchronizing separator circuit 35, and a control signal having a frequency of 4 fsc from an oscillator In addition, the PIP control circuit 34 outputs an address signal of 11 bits, to access at random a memory 39 for the time-base compression comprising a digital picture memory. The PIP control circuit 34 writes in parallel to the memory 39 the luminance signal Y and the color difference signals and B−Y which are all converted into the digital data of 6 bits by the A/D converter circuit 37 in a 18-bit width as well as reads digital data corresponding to one horizontal scanning period, of the digital data of the luminance signal Y and the color difference signals R−Y and B−Y which are all thus written to the memory 39, at intervals of a predetermined number of horizontal scanning periods at speed higher than the writing speed, to perform time-base compression of the digital.

In addition, the PIP control circuit 34 performs one of the record and read operations or the both, by the PIP control signal of 6 bits outputted from the main control circuit 18. During the recording, the PIP control circuit 34 records digital data outputted from the A/D converter circuit 37 in the storage region for one screen within the memory 39 designated by the 6-bit PIP control signal outputted from the main control circuit 18, according to the horizontal and vertical synchronizing signals supplied from the synchronizing separator circuit 35. During the reading, the PIP control circuit 34 reads digital data off designated number of screens from the memory 39 by the control signal of 6 bits supplied from the main control circuit 18, to be respectively disposed parts of vertical and horizontal synchronizing signals V and H supplied from the synchronizing separator circuit 32. The PIP control circuit 34 separates the digital data of 18 bits as read out into respective data of 6 bits of the luminance signal Y and the color difference signals R−Y and B−Y, to output the same in a time divisional manner.

A D/A converter circuit 40 comprising three D/A converters of 6 bits is connected to the PIP control circuit 34. Each of the digital data of 6 bits of the luminance signal Y and the color difference signals R−Y and B−Y which are read out from the memory 39 is applied to a corresponding D/A converter of 6 bits. The three D/A converters are responsive to a D/A clock signal applied from the PIP control circuit 34 for converting the applied digital data into an analog luminance signal Y and analog color difference signals R−Y and B−Y, respectively. The analog signals Y, R−Y and B−Y are further applied to a modulator circuit 41. On the other hand, a color synchronizing circuit 33 is responsive to the gate pulse VG applied from the synchronizing signal separator circuit 32 for outputting a color synchronizing signal having a frequency of fsc which is synchronized with the video signal outputted from the switch 30, to apply the color synchronizing signal to the modulator circuit 41. The modulator circuit 41 is responsive to the color synchronizing signal for modulating the luminarice signal Y and the color difference signals R−Y and B−Y which are applied from the D/A converter circuit 40, to output the modulated signal. More specifically, a signal outputted from the modulator circuit 41 corresponds to the subscreen video signal obtained by reducing the screen caused by The video signal outputted from the switch 31.

A mixer circuit 42 combines the subscreen video signal outputted from the modulator circuit 41 and the character pattern signal for displaying the address outputted from the above described character generator 26, to supply the same to a terminal b' of a switch 43. On the other hand, the main screen video signal outputted from the switch 30 is inputted to a terminal a' of the switch 43. The switch 43 is controlled in response to an output of the PIP control circuit 34, to be switched from the contact a' to the contact b' only during insertion of the subscreen. Consequently, a PIP video signal in which a subscreen caused by the video signal outputted from the mixer circuit 42 is inserted into a part of the main screen caused by the video signal outputted from the switch 30 is formed and outputted from video output terminal 44, to be applied to a monitor receiver (not shown) or the like externally provided.

Meanwhile, the main control circuit 18 and the PIP control circuit 34 comprise a microcomputer. A control program of an index scan function is previously stored in the main control circuit 18 while a control program of a PIP function is previously stored in the PIP control circuit FIG. 3 is a flowchart showing an automatic index scan method according to an embodiment of the present invention. The flowchart shown in FIG. 3 is carried out by the main control circuit 18 shown in the block diagram of FIG. 2. In addition, FIGS. 4A and 4B are views describing a PIP display according to an embodiment of the present invention. With reference to FIGS. 2 through 4B, an automatic index scan method according an embodiment of the present invention will be described.

The main control circuit 18 checks an output of the cassette detecting sensor 16c every predetermined period, to determine that the cassette 2 is changed (in step 101). When the cassette 2 is changed, the output of the cassette detecting sensor 16c is changed from a low logic state to a high logic state. When it is determined that the cassette 2 is changed, the main control circuit 18 sets a REW mode and supplies a control signal to a reel motor driving circuit 24, to rewind the tape in a half-loading state or a tape-unloading state (in step 102). When the tape 1 is completely rewound, a tape top detecting signal is generated by the tape top detecting sensor 16a. After step 102, the main control circuit 18 is responsive to the tape top detecting sensor 16a, to determine whether or not the tape 1 is completely rewound (in step 103). When the tape is completely rewound, the main control circuit 18 sets a stop mode, and supplies a control signal to the reel motor driving circuit 24, to stop the tape 1. And the main control circuit 18 initiates index identification data stored on RAM thereon (in step 104). After step 104, the main control circuit 18 supplies a PIP control signal to a PIP control circuit and instructs the PIP control circuit to initiate video signals for a subscreen display (in step 105).

When the cassette detecting signal is not changed in step 101, or after step 105, the main control circuit 18 checks that the index scan mode setting switch 21 or a play switch is turned on ( in steps 106 and 107).

In step 107, when the play switch is turned on, the main control circuit 18 sets a play mode, and supplies a driving signal to the reel motor driving circuit 24 and the capstan motor driving circuit 25, to drive the reel motor 23 and the capstan motor 15 in a normal reproducing state. In addition, the main control circuit 18 moves the pinch roller 14 to press the tape 1 on the capstan shaft 13. And the main control circuit 18 supplies a PIP control signal to the switch 30 to contact the switch 30 with the contact b. The video track of the tape 1 is reproduced by the video heads (not shown) of the drum 11 (in step 108). After step 108, the main control circuit 18 is responsive to the index signal detecting circuit 17 to determine that the index identification data is detected (in step 109). When the detection of the index identification data is determined in step 109, the main control circuit 18 determines whether one of the previously detected index identification data stored on its RAM is equal to the detected index identification data (in step 110). In step 110, when the previously detected index identification data is not equal to the detected index identification data, the main control circuit 18 records the detected index identification data on its RAM (in step 111). And the main control circuit 18 supplies a PIP signal to the switch 31 and the PIP control circuit to contact the switch 31 with the contact 1 and instruct the PIP control circuit 34 to record the video signal reproduced during one frame interval on the memory 39 step 112). In step 109, it is determined that the index identification data is not detected, the main control circuit 18 is responsive to the tape end detecting sensor 16b to detect a tape end detecting signal of the tape (in step 113). When the tape 1 is traveled to the end, the tape end detecting signal is generated by the tape end detecting sensor 16b. When the tape end detecting signal is detected in step 113, the main control circuit 18 sets a stop mode and supplies a control signal to a capstan motor driving circuit 25 and the reel motor driving circuit 24 to stop the reel motor 23 and the capstan motor 15. In addition, the main control circuit 18 moves the pinch roller 14 to separate the tape 1 pressed on the capstan shaft 13 (in step 114). Also, after step 112, when the detected index identification data is equal to the previously detected index identification data (in step 110), and when the tape end detecting signal is not detected (in step 113), the main control circuit 18 carries out step 109 again.

When the index scan mode setting switch is turned on in step 106, the main control circuit 18 determines that an index identification data stored on its RAM exists (in step 115). When the index identification data exists in step 115, the main control circuit 18 supplies a PIP controls signal to the switch 30 and the PIP control circuit 34, to contact the switch 30 with the contact a and instruct the PIP control circuit 34 to form a multi-PIP video signal such as A of FIG. 4 having subscreens corresponding to the number of the detected index identification data. In addition, the main control circuit 18 is responsive to the index identification data stored on its RAM to supply the control signals for indicating address of the program to the character generator 26 during the multi-PIP screen display. The character generator 26 supplies to the mixer circuit 42 a numerical pattern signal representing the address of the program while the multiple PIP screens are displayed. In FIG. 4A, Pa is a main screen and is the received video signals, and Pb1 through Pb7 are subscreens and are the reproduced video signals read from the memory 39 (in step 116).

When it is determined that the detected index identification data do not exist in step 115, or after step 116, the main control circuit 18 checks that one of the address designating switch 22, a play switch, a REW switch and an FF switch is turned on (in steps 117 and 118). When any of the address designating switch 22, the play switch, the REW switch and the FF switch is not turned on in the step 117, the main control circuit 18 checks that five seconds elapsed (in step 119).

When the address designating switch 22 is ruined on step 117, the main control circuit 18 supplies the PIP control signal to the PIP control circuit 34, to instruct the PIP control circuit 34 to form a single PIP screen shown in FIG. 4B having a video signal of the screen corresponding to the turned-on address designating switch among the video signals stored on the memory 39. And the the main control circuit 18 is responsive to the address designating switch 22 to supply the control signal for indicating the address of the selected program to the character generator. In addition, the main control circuit 18 sets an FF mode and supplies a driving signal to the reel motor driving circuit 24 to fast forward the tape 1 in a half-loading state (in step 120). After step 120, the main control circuit 18 is responsive to the index signal detecting circuit 17 to detect the index identification data (in step 121). When the index identification data is detected in the step 121, tube main control circuit 18 determines whether the detected index identification data value is equal to, greater than, or smaller than the address of the selected program (in steps 122 and 123). On the other hand, when the index identification data is not detected in the step 121, the main control circuit 18 is responsive to the tape end detecting sensor 16b to detect the tape end detecting signal (in step 124). When the tape end detecting signal is not detected in step 124 or when the detected index identification data is greater than the address of the selected program in step 112, the main control circuit sets the REW mode instead of the FF mode and supplies. The control signal to the reel motor driving circuit 24 to rewind the tape 1(in step 125). When the detected index identification data value is equal to the address of the selected program in step 122, the main control circuit cancels the index scan mode and supplies the PIP control signal to the PIP control circuit 34 to instruct the PIP control circuit 34 to stop the PIP screen forming operation (in step 126). After step 126, the main control circuit carries out step 108.

When the five seconds has elapsed in step 119, the main control circuit 18 supplies the PIP control signal to the PIP control circuit 34, and instructs the PIP control circuit 34 to stop the PIP screen forming operation (in step 127).

In addition, when any of the play switches, the FF switch and the REW switch is turned on in step 118, the main control circuit 18 rewinds or does not rewind the tape 1 to the starting position and rewinds or forwards the tape 1 at a high speed and reproduces the tape at a normal speed during a predetermined time (for instance, five minutes) to display the PIP screen such as FIG. 4B width the index identification data, whenever the index identification data is detected. And, the main control circuit 18 terminates the index scan mode when the user wants the reproducing, and then goes back to step 108.

As described above, the present invention stores video signals corresponding to one screen among reproduced video signals whenever an index signal is detected during the reproducing mode and displays video signals received during the setting of an index scan mode into a main screen and video signals stored on the memory corresponding to the detected index identification data into a plurality of subscreens, so that there is an advantage in that the user can easily find a desired program among the programs recorded on the magnetic tape.

What is claimed is:

1. An automatic index scan apparatus in a video tape recorder for reproducing contents of a recorded magnetic tape having index signals recorded at starting positions of each recorded program, said apparatus comprising:
   means for setting an index scan mode, a reproducing mode, and an address;
   tape traveling means, responsive to the setting of said index scan mode and said reproducing mode, for transporting said magnetic tape at high speed in a forward direction and a reverse direction and at normal speed in said forward direction;
   index signal detecting means for detecting said index signals during the transporting of said magnetic tape;
   reproducing means, responsive to setting of said reproducing mode, for reproducing said contents of said magnetic tape; and
   picture-in-picture forming means comprising a memory adapted to store at least one screen, being responsive to the setting of said reproducing mode, said index scan mode and said address, for storing in said memory a video signal for one screen reproduced from said magnetic tape every time said index signal are detected during the normal speed transporting of said magnetic tape, and for forming a multiple picture-in-picture screen by combining a main screen corresponding to a video signal to be received by a tuner contained in said video tape recorder and at least one subscreen corresponding to video signals for the screens stored in said memory.

2. An automatic index scan method for a video tape recorder for reproducing information recorded on at least one section of a magnetic tape having index signals recorded at starting positions of each section, said method comprising the steps of:
   detecting said index signals recorded on said magnetic tape;
   storing in a memory a video signal of a single screen of the recorded information for each section corresponding to the detected index signal whenever said index signals are detected during reproducing; and
   displaying a multiple picture-in-picture screen by combining a main screen corresponding to a video signal received by a tuner contained in said video tape recorder and a plurality of subscreens corresponding to video signals for at least one screen stored in said memory during said storing step.

3. A method for automatically index scanning a recorded medium in a video reproducing device, said recorded medium containing a plurality of programs and containing a plurality of index signals corresponding to each of said programs recorded on said recorded medium at beginning portions of said programs, said method comprising:
   detecting said index signals while advancing said recorded medium,
   storing video signals indicative of images from each one of said programs every time the corresponding ones of said index signals are detected so that said video signal from each one of said programs are simultaneously stored in a memory of said video reproducing device.

4. A method as claimed in claim 3, further comprising storing addresses of each one of said programs every time the corresponding ones of said index signals are detected.

5. A method as claimed in claim 3, wherein said advancing said recorded medium comprising setting a play mode of said video reproducing device.

6. A method as claimed in claim 3, further comprising terminating said advancing of said recorded medium in response to detecting an end of said recorded medium.

7. A method as claimed in claim 3, further comprising erasing video signals stored by said video reproducing device prior to said detecting step.

8. A method as claimed in claim 3, further comprising generating a multiple picture-in-picture image for display on a display device, said multiple picture-in-picture image being generated from the stored video signals and comprising said images from each one of said programs.

9. A method as claimed in claim 8, wherein said multiple picture-in-picture image further comprises a main screen generated in response to a broadcast signal provided by a tuner of said video reproducing device, said images from each one of said programs being subscreens.

10. A method as claimed in claim 3, further comprising displaying addresses for each one of said programs.

11. A method as claimed in claim 10, further comprising:
   enabling user designation of one of said addresses; and fast-forwarding said recorded medium to the designated address.

12. A method as claimed in claim 9, further comprising displaying addresses for each one of said programs.

13. A method as claimed in claim 12, further comprising:
enabling user designation of one of said addresses; and
fast-forwarding said recorded medium to the designated address.

14. An video tape recorder for loading a recorded medium containing a plurality of programs and containing a plurality of index signals corresponding to each of said programs recorded on said recorded medium at beginning portions of said programs, said video tape recorder comprising:
means for enabling user designation of an index scan mode, a reproducing mode, and an input address;
tape traveling means for transporting said magnetic tape in response to designation of said index scan mode;
index signal detecting means for detecting said index signals during the transporting of said magnetic tape;
reproducing means for reproducing a representative program image for each one of said programs in response to detecting of said index signals; and
picture-in-picture forming means, comprising a memory adapted to store said representative program image for each one of said programs, for generating video signals to be displayed on a video display device, said video signals representing a multiple picture-in-picture image simultaneously comprising said representative program image for each one of said programs as subscreen image.

15. An video tape recorder as claimed in claim 14, further comprising a tuner for receiving a broadcast signal, and wherein a main screen of said multiple picture-in-picture image comprises a main screen generated in response to said broadcast signal.

16. An video tape recorder for loading a recorded medium containing a plurality of programs and a plurality of index signals corresponding to each of said programs recorded on said recorded medium at beginning portions of said programs, said video tape recorder comprising:
means for enabling user designation of an index scan mode, a reproducing mode, and an input address;
tape traveling means for transporting said magnetic tape in response to designation of said index scan mode;
index signal detecting means for detecting said index signals during the transporting of said magnetic tape;
reproducing means for reproducing representative program images in response to detecting of said index signals, each one of said representative program images corresponding to a different one of said programs;
a memory for simultaneously storing each one of the reproduced representative program images; and
means for generating video signals to be displayed on a video display device, said video signals representing a multiple picture-in-picture image in which each one of said reproduced representative program images stored by said memory is simultaneously displayed as a different subscreen image.

17. A video tape recorder as claimed in claim 16, further comprising a tuner for receiving a broadcast signal, and wherein a main screen of said multiple picture-in-picture image comprises a main screen generated in response to said broadcast signal.

* * * * *

UNITED STATES PATENT AND TRADEMARK OFFICE
CERTIFICATE OF CORRECTION

PATENT NO. : 5,365,384
DATED : 15 November 1994
INVENTOR(S) : Seung-lyul CHOI

It is certified that error appears in the above-indentified patent and that said Letters Patent is hereby corrected as shown below:

Column 2,

Line 25,    after "recorder", change "fox" to --for--,

Line 47,    change "3 is a flow-chart" to --3A and 3B are flow-charts--,

Column 3,

Line 31,    after "track", insert period -- . --, (second Occ.)

Line 31,    after "track" (the second occurrence), change "on" to --On--,

Line 63,    after "tape to", change "Generate" to --generate--,

Column 4,

Line 12,    after "circuit", insert --18--,

Line 20,    before "ten-key", change "called" to --so-called--,

Line 45,    after "and", change " D " to -- b --,

Column 5,

UNITED STATES PATENT AND TRADEMARK OFFICE
CERTIFICATE OF CORRECTION

Page 2 of 3

PATENT NO. : 5,365,384
DATED : 15 November 1994
INVENTOR(S) : Seung-lyul CHOI

Figure 3A:
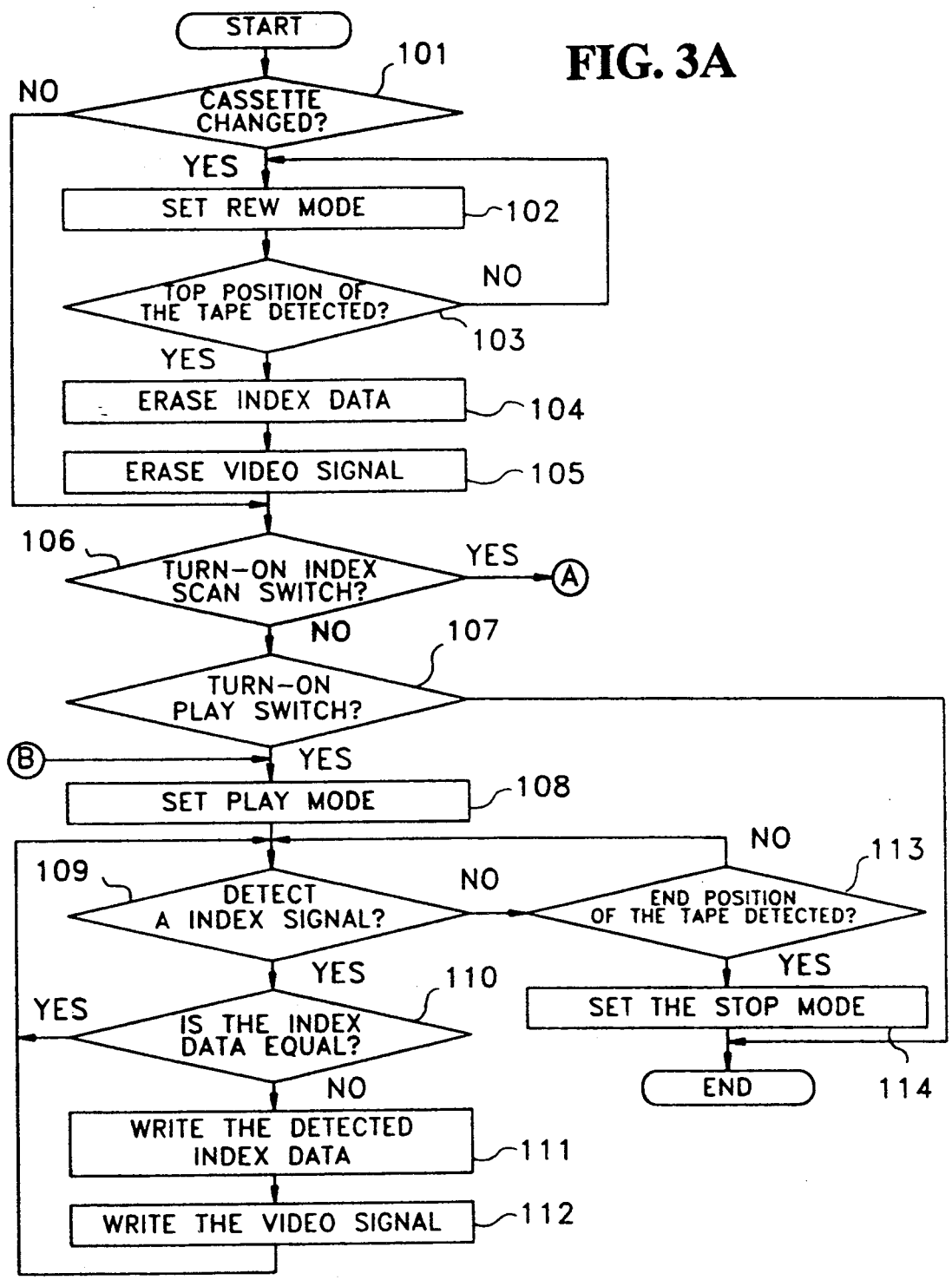
FIG. 3 is a flow-chart showing an automatic index scan method according to an embodiment of the present invention.
Figure 3B:
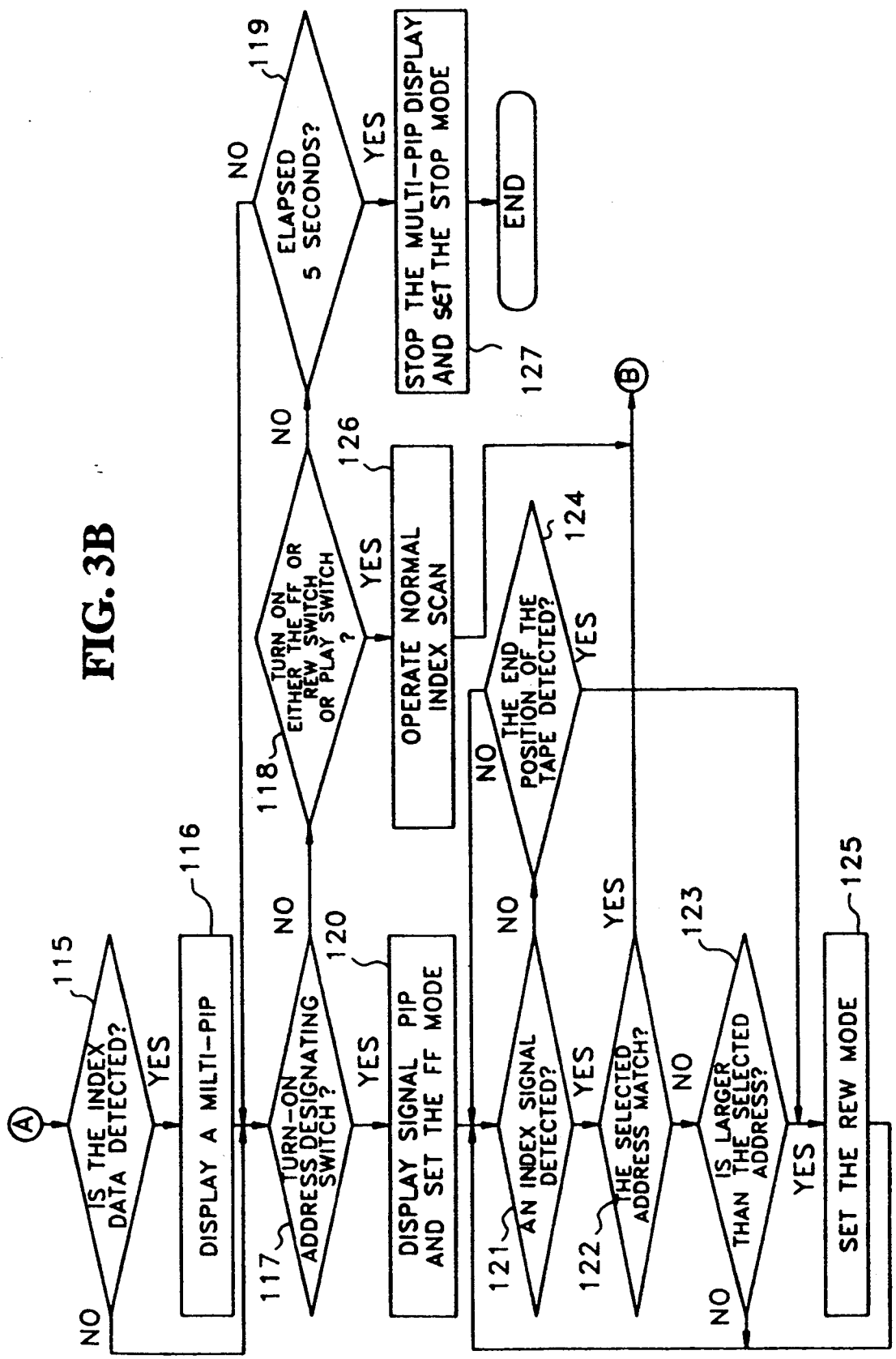
Figure 4A:
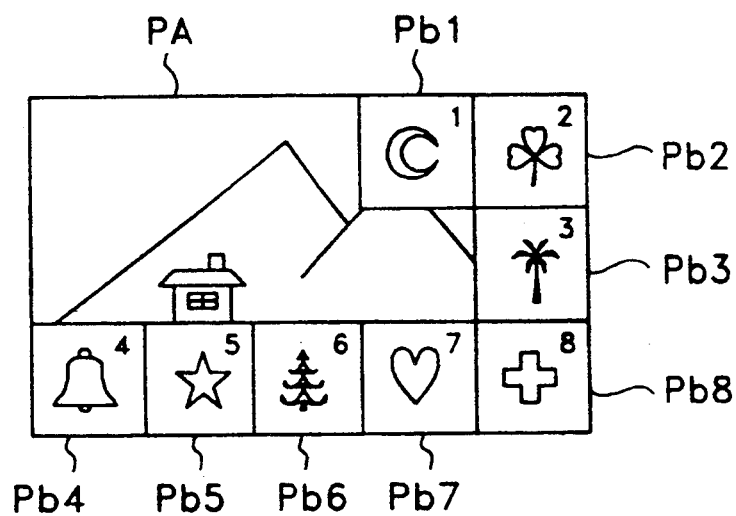
FIGS. 4A and 4B are views for explaining picture-in-picture display according to an embodiment of the present invention.
Figure 4B:
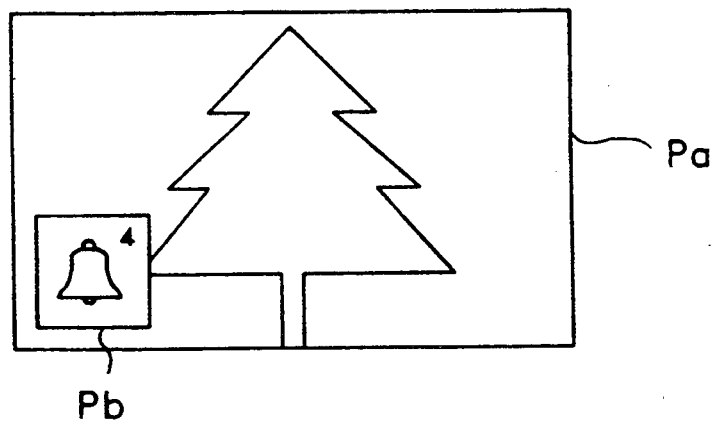

It is certified that error appears in the above-indentified patent and that said Letters Patent is hereby corrected as shown below:

| | | |
|---|---|---|
| | Line 17, | after "color difference signals", insert --R-Y--, |
| | Line 31, | before "bits", insert -- 6 --, |
| | Line 38, | after "circuit", insert --18--, |
| | Line 43, | after "oscillator", insert --38--, |
| | Line 46, | before "time-base", delete "the", |
| | Line 49, | after "signals", insert --R-Y--, |
| | Line 51, | after "width", insert comma -- , --, |
| Column 6, | | |
| | Line 2, | after "data", change "off" to --of--, |
| | Line 38, | before "video", change "the" to --the--, |
| | Line 61, | after "circuit", insert --34.--. |
| | Line 62, | change "3 is a flowchart" to --3A and 3B are flowcharts--, |
| | Line 64, | change "flowchart shown in FIG.3" to --process shown by the flowcharts in FIGs 3A and 3B-- |

UNITED STATES PATENT AND TRADEMARK OFFICE
CERTIFICATE OF CORRECTION

PATENT NO. : 5,365,384
DATED : November 15, 1994
INVENTOR(S) : Seung-lyul CHOI

It is certified that error appears in the above-indentified patent and that said Letters Patent is hereby corrected as shown below:

Column 7,

Line 57, after "circuit", insert --34,--,

Line 60, after "39", insert --(in--,

Line 64, after "tape" (the first occurrence), insert -- 1 --,

Column 9,

Line 2, after "circuit", insert --18--,

Line 3, after "supplies", delete period " . ", and change "The" to --the--,

Line 7 after "circuit", insert --18--,

Line 11 after "circuit", insert --18--:

Signed and Sealed this

Sixteenth Day of July, 1996

Attest:

BRUCE LEHMAN

*Attesting Officer*     *Commissioner of Patents and Trademarks*